(12) United States Patent
Mitsuhashi et al.

(10) Patent No.: US 9,564,618 B2
(45) Date of Patent: Feb. 7, 2017

(54) ASSEMBLED BATTERY (71) Applicant: TOYOTA JIDOSHA KABUSHIKI KAISHA, Toyota-shi, Aichi-ken (JP)

(72) Inventors: Hideto Mitsuhashi, Toyota (JP); Yasuhiro Otsuka, Kosai (JP)

(73) Assignee: TOYOTA JIDOSHA KABUSHIKI KAISHA, Toyota-shi, Aichi-ken (JP)

(*) Notice: Subject to any disclaimer, the term of this patent is extended or adjusted under 35 U.S.C. 154(b) by 32 days.

(21) Appl. No.: 14/697,192

(22) Filed: Apr. 27, 2015

(65) Prior Publication Data
US 2015/0349304 A1 Dec. 3, 2015

(30) Foreign Application Priority Data

May 30, 2014 (JP) ................. 2014-112670

(51) Int. Cl.
| | | |
|---|---|---|
| *H01M 2/04* | (2006.01) | |
| *H01M 2/12* | (2006.01) | |
| *H01M 2/10* | (2006.01) | |
| *H01M 2/02* | (2006.01) | |

(52) U.S. Cl.
CPC .......... *H01M 2/0482* (2013.01); *H01M 2/043* (2013.01); *H01M 2/12* (2013.01); *H01M 2/1252* (2013.01); *H01M 2/0277* (2013.01); *H01M 2/1077* (2013.01); *H01M 2220/20* (2013.01)

(58) Field of Classification Search
CPC H01M 2/1229; H01M 2/1235; H01M 2/1241; H01M 2/1252; H01M 2/1276; H01M 2/1282; H01M 2/1288; H01M 2/1294; H01M 2/0267

See application file for complete search history.

(56) References Cited

U.S. PATENT DOCUMENTS

| | | | |
|---|---|---|---|
| 6,444,348 B1 | 9/2002 | Saijo et al. | |
| 2009/0111007 A1* | 4/2009 | Naganuma | H01M 2/1077 429/82 |
| 2010/0073005 A1* | 3/2010 | Yano | H01M 2/1066 324/427 |

(Continued)

FOREIGN PATENT DOCUMENTS

| | | |
|---|---|---|
| JP | 62-178452 U | 11/1987 |
| JP | 11-260329 A | 9/1999 |

(Continued)

*Primary Examiner* — Ula C Ruddock
*Assistant Examiner* — Amanda Barrow
(74) *Attorney, Agent, or Firm* — Sughrue Mion, PLLC (57) ABSTRACT

The present specification discloses a technology for protecting a portion where corrosion may occur in the assembled battery. An assembled battery includes a plurality of battery packs. Each of the battery packs includes a housing with an opening at a top thereof, a cover plate, and a relief valve. The cover plate is welded at the opening which seals the housing. The relief valve is provided on the cover plate. The assembled battery further includes an exhaust cover and an insulating sheet. The exhaust cover covers the relief valve of each of the battery packs, and guides, toward the outside of the assembled battery, an internal gas that comes out of the relief valves. The insulating sheet may cover a portion of a welded line between the housing and the cover plate of each battery pack, and the portion faces the exhaust cover.

2 Claims, 8 Drawing Sheets

(56) References Cited

U.S. PATENT DOCUMENTS

| | | | | |
|---|---|---|---|---|
| 2011/0151311 A1* | 6/2011 | Lee | ................... | H01M 2/1077 |
| | | | | 429/156 |
| 2012/0196162 A1 | 8/2012 | Shiraishi et al. | | |
| 2013/0171510 A1* | 7/2013 | Tsutsumi | ............ | H01M 2/0426 |
| | | | | 429/179 |
| 2013/0252045 A1* | 9/2013 | Park | ................... | H01M 2/1016 |
| | | | | 429/82 |
| 2013/0273397 A1 | 10/2013 | Watanabe et al. | | |
| 2015/0132618 A1* | 5/2015 | Han | ..................... | H01M 2/345 |
| | | | | 429/53 |

FOREIGN PATENT DOCUMENTS

| | | | | |
|---|---|---|---|---|
| JP | 2003-168404 A | 6/2003 | | |
| JP | 2008-262733 A | 10/2008 | | |
| JP | 2009-146680 A | 7/2009 | | |
| JP | 2012-113896 A | 6/2012 | | |
| JP | 2012-129043 A | 7/2012 | | |
| JP | 2012-178333 A | 9/2012 | | |
| JP | 2013-171746 | * 9/2013 | ............. | H01M 2/10 |
| JP | 2013-171746 A | 9/2013 | | |
| KR | 10-2001-0013393 A | 2/2001 | | |

\* cited by examiner

ASSEMBLED BATTERY

CROSS-REFERENCE TO RELATED APPLICATION

This application claims priority to Japanese Patent Application No. 2014-112670 filed on May 30, 2014, the contents of which are hereby incorporated by reference into the present application.

TECHNICAL FIELD

The teaching disclosed herein relates to an assembled battery in which a plurality of battery packs is arranged in a predetermined direction and in which the plurality of battery packs is electrically connected in parallel or series to each other.

DESCRIPTION OF RELATED ART

For the realization of a high-capacity or high-power secondary battery (rechargeable battery), an assembled battery has been known in which battery packs (referred to also as "battery cells") are arranged in a predetermined direction and electrically connected in parallel or series to each other (e.g. Japan Patent Application Publication No. 2008-262733 (JP, A)). An example of an application of such an assembled battery is an electric vehicle. The term "electric vehicle" as used herein includes a hybrid vehicle including both a motor and an engine.

As each of the battery packs, a chemical battery such as a lithium ion battery is often used. The chemical battery is provided with a housing. The housing contains an electrolyte. The housing is hermetically closed (sealed) so that the electrolyte does not leak. Meanwhile, in order to prevent the housing from bursting when an internal pressure of the housing becomes excessively high due to a temperature increase or the like, each of the battery packs has a relief valve on the body. The relief valve is configured to break (open) under a predetermined pressure.

When an assembled battery including such battery packs is mounted on a vehicle, various protective measures are taken. For example, in the assembled battery disclosed in Japan Patent Application Publication No. 200-262733 (JP, A), battery packs each having a relief valve provided on an upper surface thereof are arranged in parallel to each other, and an exhaust cover configured to cover the top of the relief valve of each of the battery packs is attached. The exhaust cover is provided to safely guide a high temperature and pressure electrolyte that comes out at the time of burst of the relief valve and thereby prevent the high temperature and pressure electrolyte from scattering around.

A housing of a typical battery pack is in a flattened shape having wide side surfaces. The housing has an opening at a top thereof, with a cover plate welded at the opening and sealing the inside thereof. A minute pinhole may be formed in a welded line between the housing and the cover plate, and moisture may enter through the pinhole and corrode the housing. Japan Patent Application Publication No. H11-260329 (JP, A) discloses a technology of covering a welded line with fluoro-rubber resin.

Further, Japan Patent Application Publication No. 2003-168404 (JP, A) discloses a battery in which a welded line between an opening of a housing and a cover plate is entirely covered with a protecting film. Further, Japan Patent Application Publication No. 2.012-178333 (JP, A) discloses a battery in which a relief valve is provided on an upper surface of each battery pack and a cover configured to prevent adhesion of dust or the like is attached to the relied valves.

SUMMARY

The present specification relates to an assembled battery that is suitable to be mounted on a vehicle and, in particular, provides a technology of protecting a portion in the assembled battery where corrosion may occur.

An assembled battery disclosed herein is a type of assembled battery comprising a plurality of battery packs arranged in a predetermined direction. Each of the battery packs includes a housing with an opening at a top of the housing, a cover plate, and a relief valve. The cover plate is welded at the opening and seals the housing. The relief valve is provided on the cover plate, and opens when an internal pressure of the housing increases. The relief valve may be made, for example, of a sheet or a plate that breaks under a predetermined pressure. Each of the battery packs may typically be in a flattened shape having wide side surfaces, and the battery packs may he arranged so that their flattened surfaces face each other. The assembled battery further comprises an exhaust cover and insulant. The exhaust cover extends along the predetermined direction and covers the relief valve of each of the battery packs. The exhaust cover is configured to guide, toward the outside of the assembled battery, an internal gas that comes out of the relief valves. Moreover, the insulant covers a portion of a welded line between the housing and the cover plate of at least one battery pack, the portion facing the exhaust cover. The insulant may cover the welded line and the relief valve of each of the battery packs. In that case, it is preferable that the strength of the insulant be controlled so that the insulant breaks one the relief valve breaks.

The exhaust cover is configured to guide, toward the outside, a gas or electrolyte that comes out when the relief valves are opened. Therefore, an inner side space of the exhaust cover communicates with the outside (typically the outside of the vehicle). This allows easy entry of dust or moisture from the outside into the inner side space of the exhaust cover. That is, this allows easy adhesion of dust or moisture to the relevant portion of the welded line between the housing and the cover plate of the battery pack which faces the exhaust cover. A connection between adjacent battery packs through the adhered dust or the like may cause a current to pass between the housings of the adjacent battery packs. When the current flows through the welded line, it may cause corrosion. In the assembled battery having the exhaust cover configured to guide, toward the outside, the gas or the electrolyte that comes out when a relief valve is actuated, the technology disclosed herein protects that portion of the welded line between the housing and the cover plate to which dust or the like easily adheres.

Details of and further improvements in the technology disclosed herein are described in section "EMBODIMENT."

DETAILED DESCRIPTION

Figure 1A:
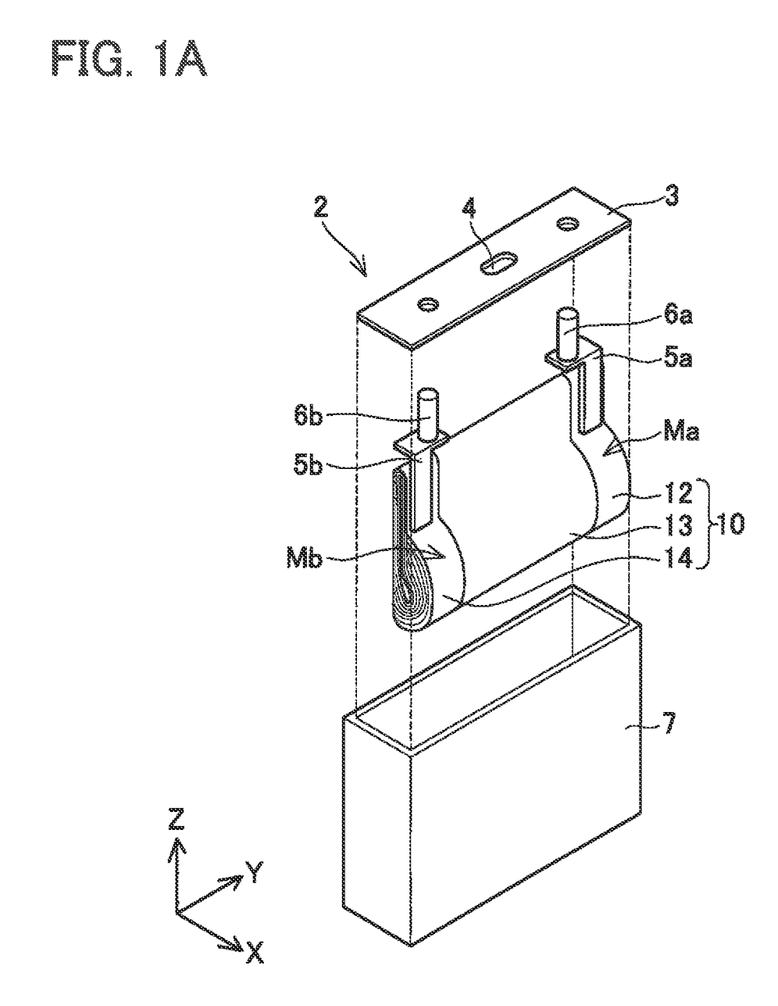
FIG. 1A is an exploded perspective view of a battery pack.
Figure 1B:
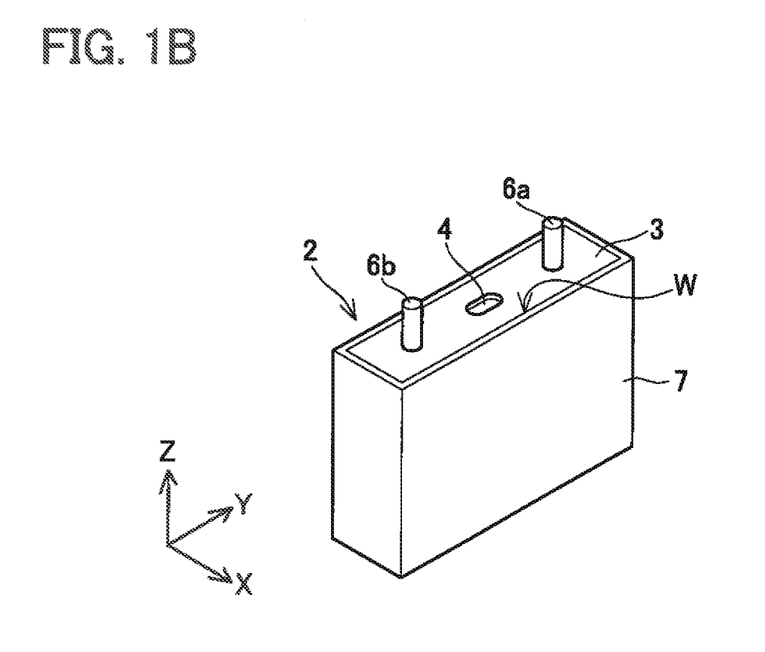
FIG. 1B is a perspective view of the battery pack.

An assembled battery of an embodiment will be described with reference to the drawings. First, a battery pack that constitutes the assembled battery is described. FIG. 1A shows an exploded perspective view of a battery pack 2. FIG. 1B shows a perspective view of the battery pack 2. The battery pack 2 is a lithium ion battery of which main body is an electrode body 10. The electrode body 10 is a roll of a positive electrode sheet 12, a separator 13, and a negative electrode sheet 14 that are wound with the separator 13 sandwiched between the positive electrode sheet 12 and the negative electrode sheet 14. The positive electrode sheet 12 is a long conductive sheet with a positive-electrode active material applied thereto except for one side edge of the conductive sheet. The negative electrode sheet 14 is a long conductive sheet with a negative-electrode active material applied thereto except for one side edge of the conductive sheet. Regions to which no active material has been applied are sometimes referred to as "unpainted portions." The positive electrode sheet 12 and the negative electrode sheet 14 are stacked in by being offset relative to each other by a predetermined length in the across-the-width direction so that the regions to which the respective active materials have been applied overlap each other but the unpainted portions do not overlap each other. The separator 13 is put on a region of overlap between the positive electrode sheet 12 and the negative electrode sheet 14. Therefore, only turns of the positive electrode sheet 12 (the unpainted portion thereof) are bundled together at one end of the electrode body 10 in a winding axis direction, and only turns of the negative electrode sheet 14 (the unpainted portion thereof) are bundled together at the other end. The bundle of turns of the positive electrode sheet 12 is referred to as a positive electrode tab Ma, and the bundle of turns of the negative electrode sheet 14 is referred to as a negative electrode tab Mb. A positive-electrode current collector 5a is bonded to the positive electrode tab Ma, and a negative-electrode current collector 5b is bonded to the negative electrode tab Mb. The current collectors 5a and 5b are metal conductors configured to collect a current flowing from the positive electrode tab Ma to the negative electrode tab Mb. The positive-electrode current collector 5a has a leading end connected to a positive electrode terminal 6a, and the negative-electrode current collector 5b has a leading end connected to a negative electrode terminal 6b. The electrode body 10 and the current collectors 5a and 5b are housed in a housing 7 together with an electrolyte, with a cover plate 3 sealing an opening at a top of the housing 7. The housing 7 is in the shape of a bottomed cylinder. Further, the housing 7 is entirely flattened with two widest side faces facing each other. The housing 7 is hermetically closed by welding the cover plate 3 to the peripheral edge of the opening at the top, which is small in width, of the housing 7. In FIG. 1B, the reference sign W refers to a welded line. In each of the subsequent drawings, the reference sign W refers to a welded line between the cover plate 3 and the housing 7.

The cover plate 3 has two holes provided therein, and the positive electrode terminal 6a and the negative electrode terminal 6b are exposed through the holes, respectively. Although not illustrated, a space between the positive electrode terminal (negative electrode terminal) and the corresponding hole is sealed with resin so that an internal space of the housing is hermetically closed (sealed).

In addition to the holes through which the terminals 6a and 6b are passed, the cover plate 3 is provided with a relief valve 4. The relief valve 4 is made to break (open) when an internal pressure of the hermetically-closed housing exceeds a predetermined threshold value. The relief valve 4 is made of a sheet or a plate that breaks when a pressure of a predetermined threshold value is applied thereto. When the internal pressure in the housing exceeds the predetermined threshold value and the relief valve 4 breaks, the high temperature and pressure electrolyte may come out of the relief valve 4 together with an internal gas.

Figure 2:
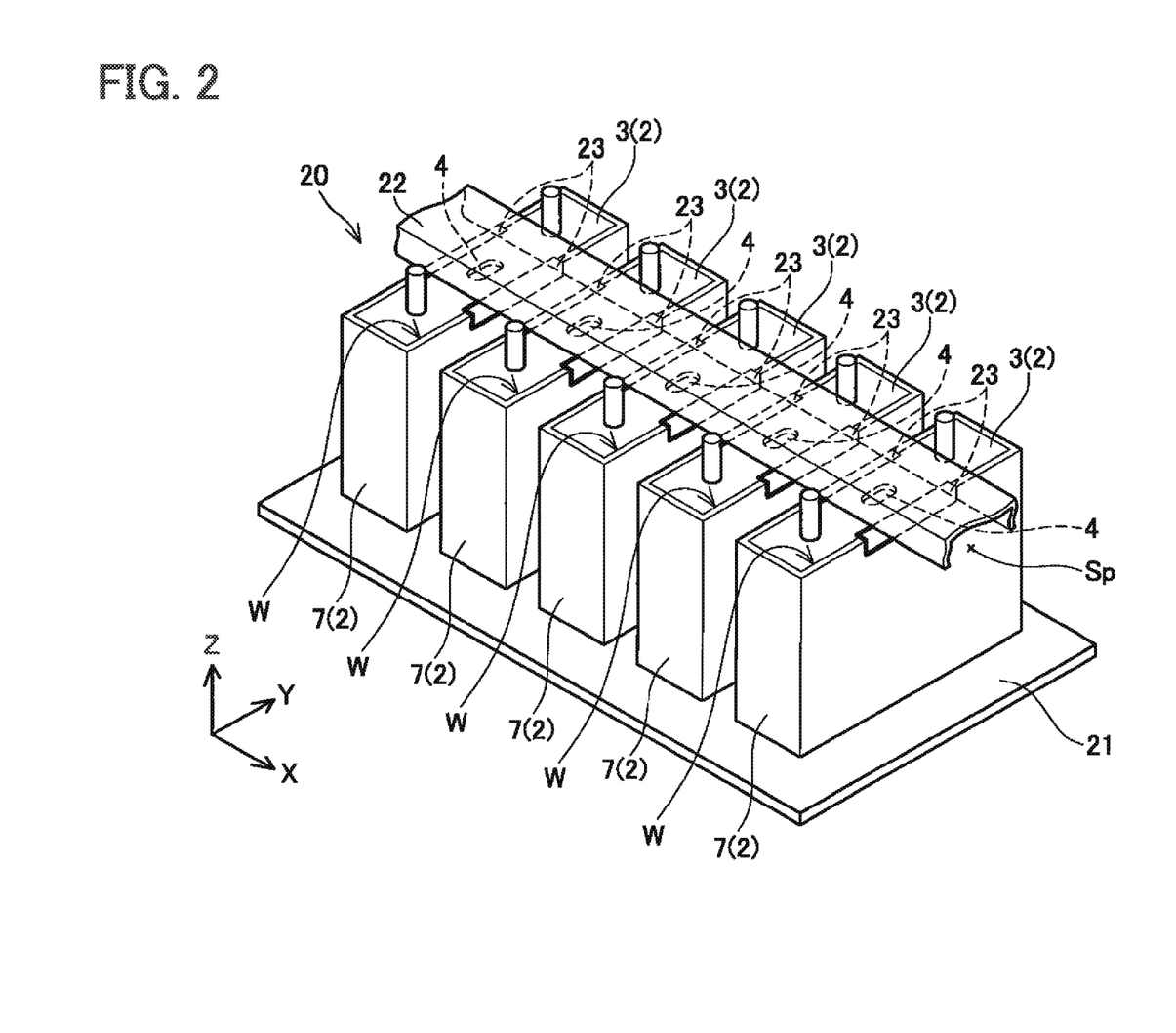
FIG. 2 is a perspective view of an assembled battery.
Figure 3A:
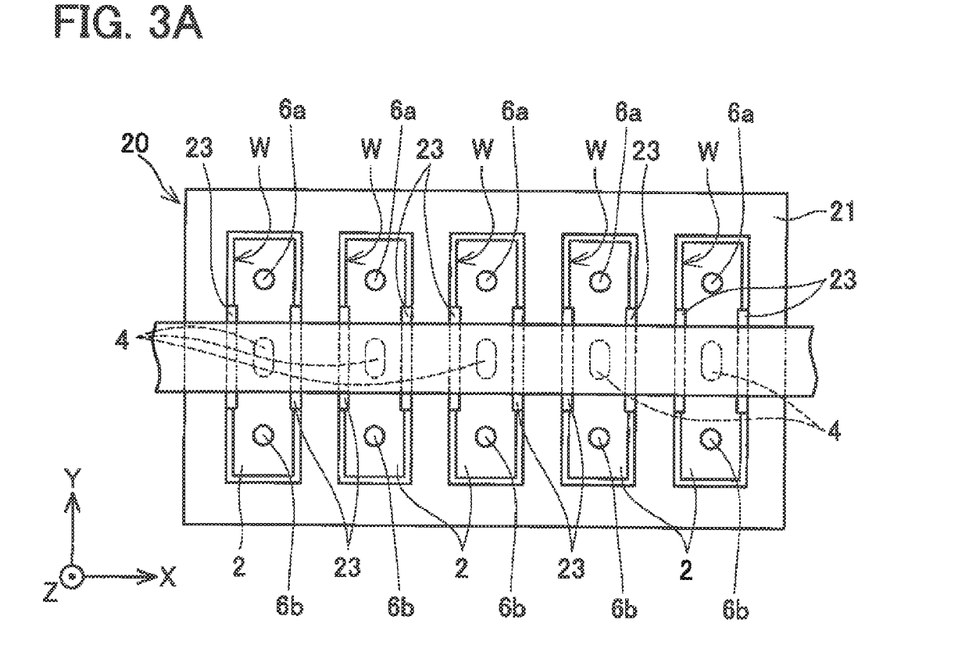
FIG. 3A is a plan view of the assembled battery.
Figure 3B:
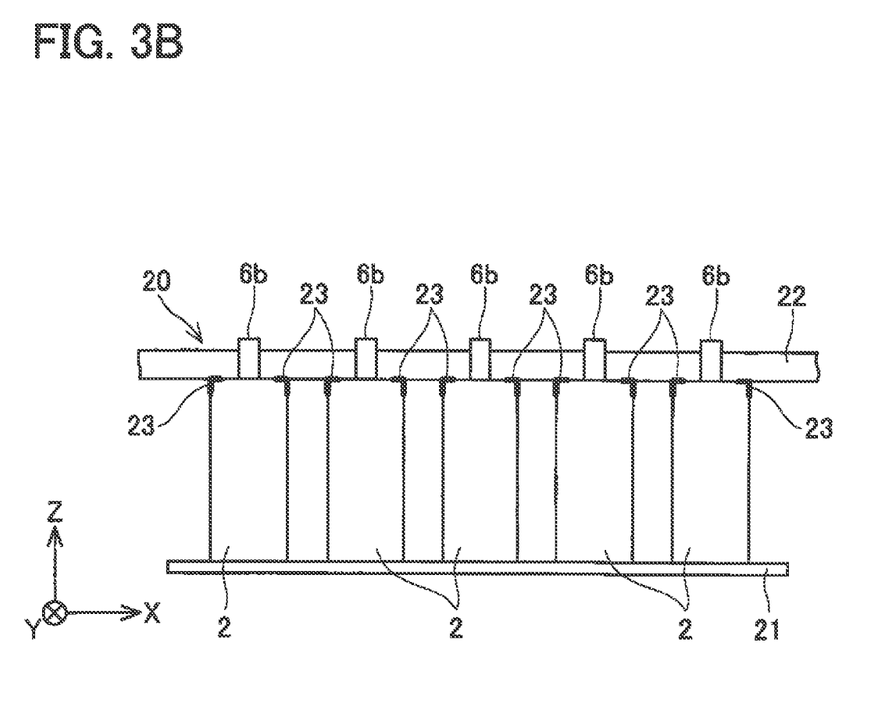
FIG. 3B is a side view of a long side of the assembled battery.
Figure 3C:
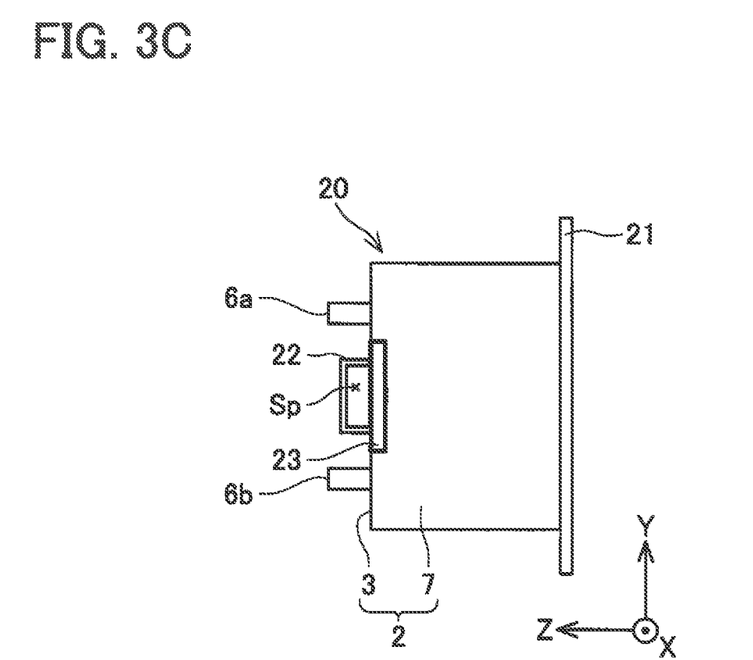
FIG. 3C is a side view of a short side of the assembled battery.

Next, an assembled battery 20 is described with reference to FIG. 2 and FIGS. 3A, 3B, and 3C. FIG. 2 is a perspective view of the assembled battery 20. FIG. 3A shows a plan view of the assembled battery 20. FIG. 3B shows a side view of a long side of the assembled battery 20. FIG. 3C shows a side view of a short side of the assembled battery 20. The assembled battery 20 is a module including five battery packs 2 arranged in parallel to each other. Each of the five battery packs 2 is identical to the one shown in FIGS. 1A and 1B. The five battery packs 2 are arranged along the X-axis direction in the drawings. Although not illustrated, the positive terminal electrode of each battery pack 2 is connected to the negative electrode terminal of an adjacent battery pack 2. That is, the plurality of battery packs 2 is electrically connected in series to each other. This allows the assembled battery 20 to output a voltage five times as high as a voltage that a single battery pack outputs. In this way, the assembled battery achieves a high power (or a high capacity) through the serial (or parallel) connection of the plurality of battery packs.

Each of the battery packs 2 is used in such a posture that the surface on which the terminals 6a and 6b are exposed and in which the relief valve 4 is provided faces a vertically upward direction. Therefore, the cover plate 3 is equivalent to an upper surface of each of the bodies of the battery packs 2. A combination of the housing 7 and cover plate 3 is equivalent to the body. It should be noted that the positive Z-axis direction in the drawings is equivalent to the vertically upward direction.

The plurality of battery packs 2 is fixed to a base plate 21. The plurality of battery packs 2 is arranged so that the flattened surface of each battery pack 2 faces the flattened surface of the other battery pack 2. This causes the relief valves 4 provided on the cover plates 3 to be arranged in a row, facing in the vertically upward direction. The assembled battery 20 is mounted with an exhaust cover 22 configured to cover the plurality of relief valves 4 arranged in a row. The exhaust cover 22 is made, for example, of a highly heat-resistant resin. The external shape of a cross-section of the exhaust cover 22 is the shape of a rectangular pipe cut in half lengthwise. The exhaust cover 22 is placed such a posture that the cut open side faces downward. Although not illustrated, an internal space Sp of the exhaust cover 22 communicates with the outside of the assembled battery (and by extension with the outside of the vehicle). The exhaust cover 22 is a member configured to guide, toward the outside of the assembled battery 20 (and by extension toward the outside of the vehicle), a gas or an electrolyte that comes out of a relief valve 4 when the relief valve 4 opens. From another standpoint, the exhaust cover 22 serves as a protective cover to prevent the electrolyte that comes out of the relief valve 4 from scattering around.

The assembled battery 20 further includes insulating sheets 23. Each of the insulating sheets 23 covers a portion of the welded line W between the housing 7 and the cover plate 3 of the corresponding battery pack 2. The portion faces the exhaust cover 22. The insulating sheets 23 are in contact with the exhaust cover 22. Also, each insulated sheet 23 covers a corner of the corresponding battery pack 2, the corners extending across a short side of the exhaust cover 22. The insulating sheets 23 are made of silicon rubber, resin, or the like. The insulating sheets 23 prevent dust entering through the internal space Sp of the exhaust cover 22 from adhering to the welded lines W. When dust or the like adheres to the welded lines W and accumulates to form a connection between the adjacent battery packs, a current may flow between the battery packs through the accumulated dust. Such a current may cause damage to the welded lines W. For example, when the current flows through the welded lines W, it may cause corrosion therein. The insulating sheets protect the welded lines W from such damage.

The insulating sheet 23 is a tape that has an adhesive applied to one side. As such, the insulating sheet 23 can be easily adhered.

Figure 4A:
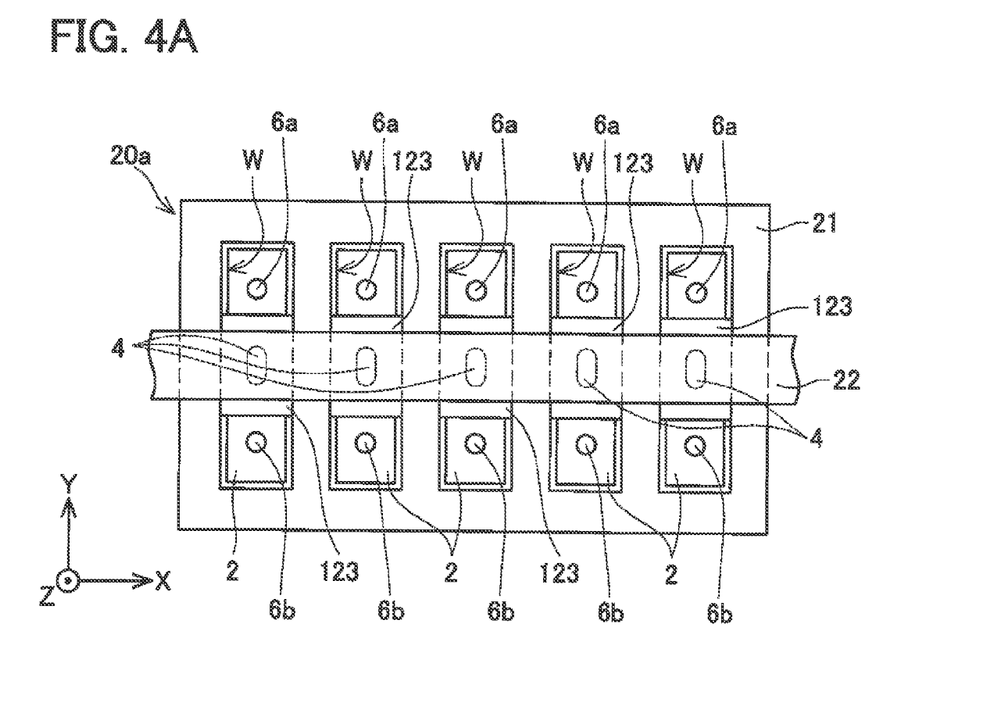
FIG. 4A is a plan view of an assembled battery of a modification.
Figure 4B:
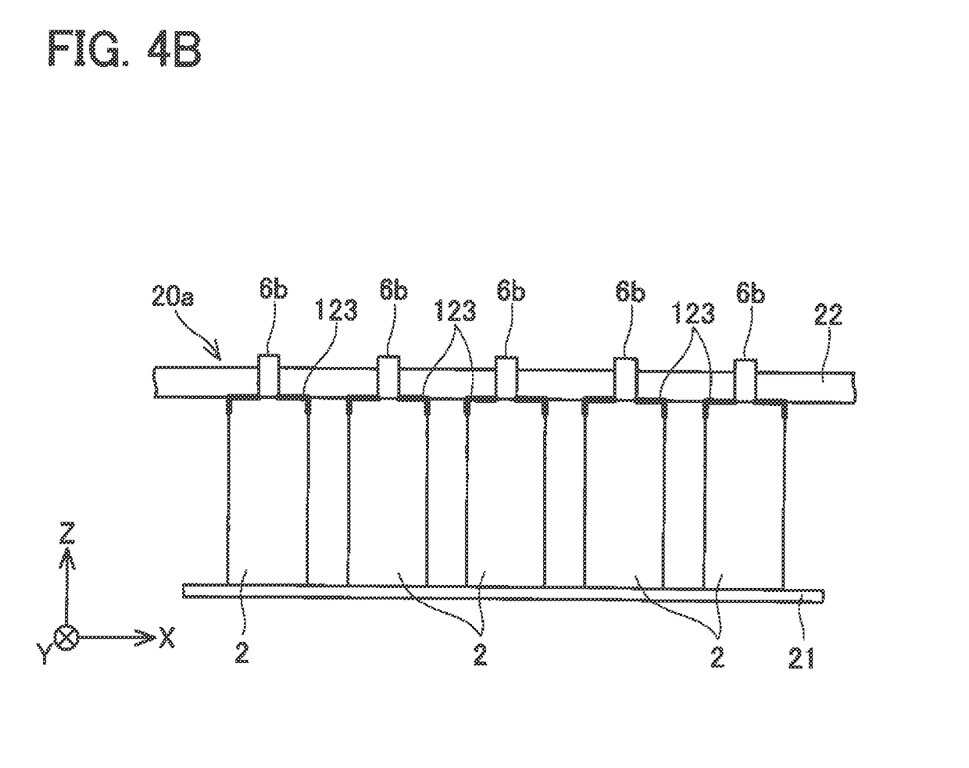
FIG. 4B is a side view of the assembled battery of the modification.

FIG. 4A shows a plan view of an assembled battery 20a of a modification. FIG. 4B shows a side view of a long side of the assembled battery 20a. The assembled battery 20a of the modification is identical in structure to the aforementioned assembled battery 20 except for insulating sheets 123. In this modification, each insulating sheet 123 covers the relief valve 4 as well as the welded line W of the corresponding battery pack 2. In FIG. 4A, parts of the insulating sheets 123 are represented by dashed lines (hidden line) because they are located below the exhaust cover 22. It should also be noted that in FIG. 4A, each of the relief valves 4 is represented by a dotted line indicating that the relief valve 4 is located on the underside of the corresponding insulating sheet 123, which is represented by a dashed line. The insulating sheets 123 are made of a material whose strength is equal to or lower than such a strength that the insulating sheet 123 breaks at the same time as its corresponding relief valve 4 breaks due to an increase of the internal pressure of the housing.

The assembled battery 20a of the modification protects h relieve valves, as well as the welded portion between the housing and the cover plate of each of the battery packs, from dust or the like.

Points to be noted about the assembled battery described in the embodiment will be stated. The assembled battery of the embodiment includes the exhaust cover 22 and the insulating sheets 23. The exhaust cover 22 guides, toward the outside, a gas or an electrolyte that comes out of the relief valves 4. The insulating sheets 23 protect the welded lines W from dust or the like entering through the exhaust cover 22 from outside. The insulating sheet 23 protects, from dust or the like, a portion of the corresponding welded line W to which dust or the like may easily adhere.

The assembled battery disclosed herein is suitable for use in an environment where dust or the like entering from outside may adhere to a weld portion between a housing and a cover plate of a battery pack. That is, the technology disclosed herein is suitable to an assembled battery that is mounted on an electric vehicle.

The assembled battery of the embodiment has separate insulating sheets pasted on each separate battery pack. It is also preferable that a plurality of battery packs (or all of the battery packs) be covered with a single insulating sheet. This shortens the time required to execute the work of attaching the insulating sheet.

In the assembled battery 20 of the embodiment and the assembled battery 20a of the modification, that portion of the welded line W between the housing and the cover plate of each of the battery packs which faces the exhaust cover is covered with one or more insulating sheets, but an area on each welded line W that does not face the resin cover is riot covered with any insulating sheet. Therefore, the assembled battery 20 of the embodiment and the assembled battery 20a of the modification can be manufactured at lower cost than an assembled battery in which the welded lines W are entirely covered with the insulating sheets.

The battery packs of the assembled battery of the embodiment are lithium ion batteries. However, the technology disclosed herein can also be applied to other types of batteries. The technology disclosed herein can be suitably applied, for example, to an assembled battery with a plurality of battery packs of a nickel-metal-hydride type.

Specific examples of the present invention has been described in detail, however, these are mere exemplary indications and thus do not limit the scope of the claims. The art described in the claims include modifications and variations of the specific examples presented above. Technical features described in the description and the drawings may technically be useful alone or in various combinations, and are not limited to the combinations as originally claimed. Further, the art described in the description and the drawings may concurrently achieve a plurality of aims, and technical significance thereof resides in achieving any one of such aims.

What is claimed is:

1. An assembled battery comprising:
    battery packs arranged in a predetermined direction, wherein each of the battery packs comprises:
        a housing with an opening at a top of the housing;
        a cover plate welded at the opening and sealing the housing; and
        a relief valve provided on the cover plate, and configured to open when an internal pressure of the housing increases;
    an exhaust cover extending along the predetermined direction and covering the relief valve of each of the battery packs; and
    an insulant covering the relief valve and a portion of a welded line between the housing and the cover plate of each of the battery packs, the portion facing the exhaust cover, the insulant being configured to break at a same time as the relief valve breaks due to an increase of the internal pressure of the housing.

2. The assembled battery of claim 1, wherein the insulant covers the portions of the welded lines of all of the battery packs.

* * * * *